(12) United States Patent
Maruyama et al.

(10) Patent No.: US 8,498,833 B2
(45) Date of Patent: Jul. 30, 2013

(54) METHOD OF, APPARATUS FOR, AND PROGRAM FOR INSPECTING STACK BODY

(75) Inventors: Mari Maruyama, Wako (JP); Ushio Harada, Wako (JP); Hiroshi Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 12/919,390

(22) PCT Filed: Feb. 16, 2009

(86) PCT No.: PCT/JP2009/053104
§ 371 (c)(1),
(2), (4) Date: Oct. 28, 2010

(87) PCT Pub. No.: WO2009/107564
PCT Pub. Date: Sep. 3, 2009

(65) Prior Publication Data
US 2011/0040507 A1    Feb. 17, 2011

(30) Foreign Application Priority Data

Feb. 27, 2008    (JP) .................................. 2008-045681

(51) Int. Cl.
*G01F 17/00*    (2006.01)
(52) U.S. Cl.
USPC ............... 702/65; 424/450; 428/329; 398/66; 429/489; 429/496; 429/516
(58) Field of Classification Search
USPC ................. 702/65, 156; 429/489, 497, 533, 429/535, 255, 247, 249, 496, 516, 514, 532, 429/534; 73/149; 502/101; 424/450; 95/47, 95/52; 428/395, 375, 408, 329, 842.3, 842.8, 428/838, 694; 427/577, 249.8, 131; 398/66, 398/164, 118; 29/623.3, 623.1, 623.5, 623.4
See application file for complete search history.

(56) References Cited

U.S. PATENT DOCUMENTS

| | | | |
|---|---|---|---|
| 4,579,789 A * | 4/1986 | Fukuda et al. | 429/514 |
| 6,458,170 B1 * | 10/2002 | Visco et al. | 29/623.4 |

(Continued)

FOREIGN PATENT DOCUMENTS

| | | |
|---|---|---|
| JP | 2002-90346 | 3/2002 |
| JP | 2004-327129 | 11/2004 |
| JP | 2005-108801 | 4/2005 |

OTHER PUBLICATIONS

International Search Report for Application No. PCT/JP2009/053104, dated Jul. 27, 2009.

*Primary Examiner* — Carol Tsai
(74) *Attorney, Agent, or Firm* — Nelson Mullins Riley & Scarborough LLP; Anthony A. Laurentano

(57) ABSTRACT

A method of inspecting a stack body of at least a porous layer and a dense layer comprises the first step of measuring the length of the stack body before the stack body is fired, the second step of measuring the length of the stack body after the stack body is fired, the third step of calculating a shrinkage rate of the stack body based on a first measured value from the first step and a second measured value from the second step, the fourth step of determining whether the calculated shrinkage rate of the stack body is acceptable or not based on the calculated shrinkage rate, the fifth step of calculating an S/N ratio of the stack body based on the first measured value and the second measured value, and the sixth step of determining whether the current-voltage characteristics of the stack body are acceptable or not based on the calculated S/N ratio.

13 Claims, 6 Drawing Sheets

U.S. PATENT DOCUMENTS

| | | |
|---|---|---|
| 6,534,211 B1 | 3/2003 | Tsukuda et al. |
| 6,740,441 B2 * | 5/2004 | Jacobson et al. ............... 429/468 |
| 6,794,078 B1 * | 9/2004 | Tashiro et al. ................. 429/492 |
| 6,921,557 B2 * | 7/2005 | Jacobson et al. ............ 427/376.1 |
| 6,958,196 B2 * | 10/2005 | Gorte et al. .................... 429/489 |
| 7,033,637 B1 * | 4/2006 | Hunt et al. ....................... 427/77 |
| 7,045,239 B2 * | 5/2006 | Donelson et al. .............. 429/484 |
| 7,232,626 B2 * | 6/2007 | Jacobson et al. .............. 429/128 |
| 7,745,031 B2 * | 6/2010 | Larsen et al. .................. 429/495 |
| 7,829,213 B2 * | 11/2010 | Jacobson et al. .............. 429/128 |
| 8,039,175 B2 * | 10/2011 | Linderoth et al. ............. 429/535 |

* cited by examiner

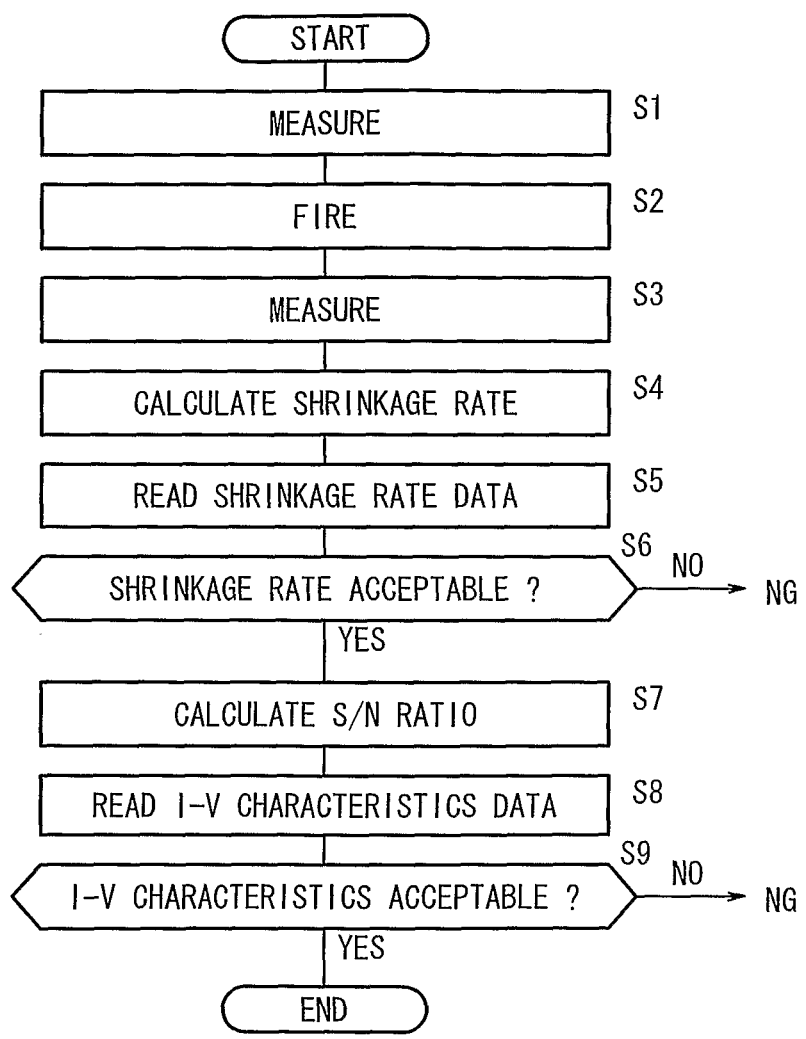

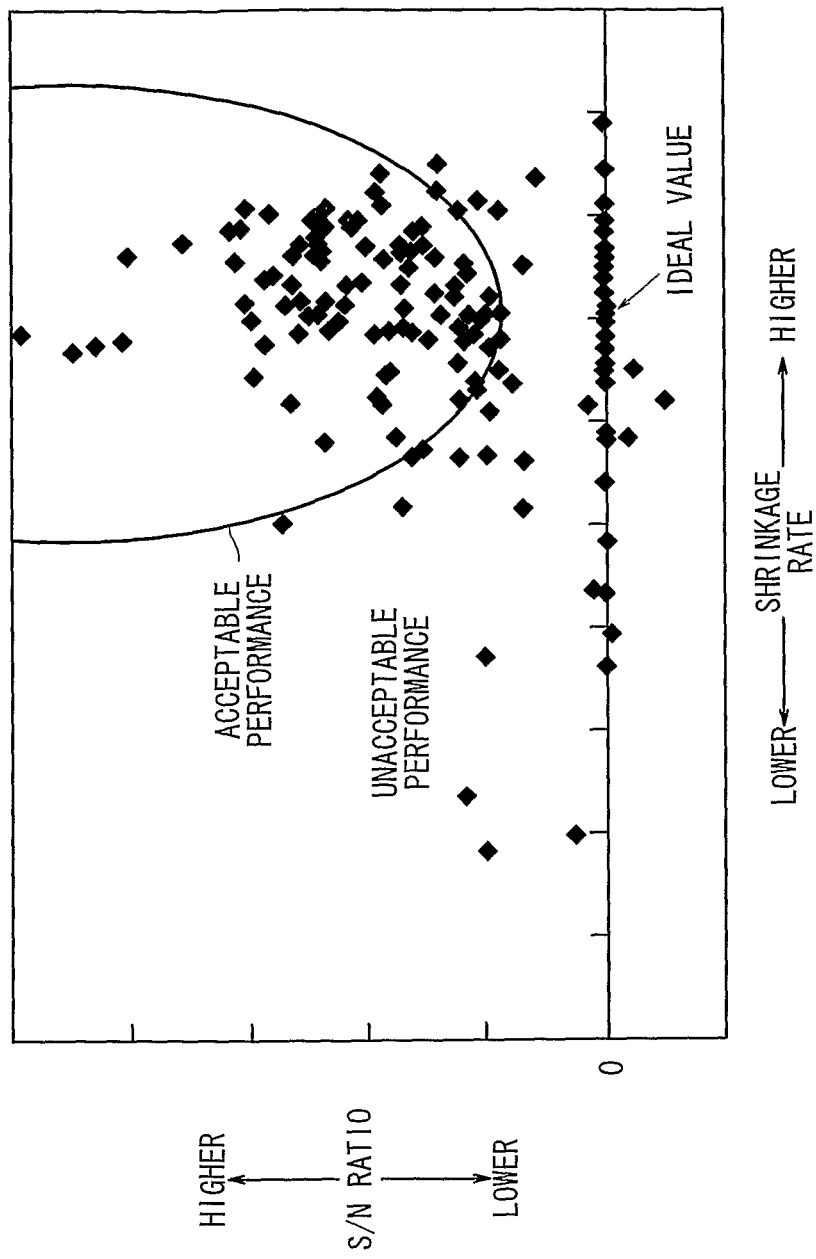

METHOD OF, APPARATUS FOR, AND PROGRAM FOR INSPECTING STACK BODY

RELATED APPLICATIONS

This application is a 35 U.S.C. 371 national stage filing of International Application No. PCT/JP2009/053104, filed Feb. 16, 2009, which claims priority to Japanese Patent Application No. 2008-045681 filed on Feb. 27, 2008 in Japan. The contents of the aforementioned applications are hereby incorporated by reference.

TECHNICAL FIELD

The present invention relates to a method of, an apparatus for, and a program, executable by a computer, for inspecting a stack body of at least a porous layer and a dense layer.

BACKGROUND ART

Solid oxide fuel cells (SOFC) have an electrolyte comprising an oxide ion conductor such as stabilized zirconia, for example. In the solid oxide fuel cells, an electrolyte electrode assembly (membrane electrode assembly), which is also referred to as MEA hereinafter, including an anode and a cathode that are disposed one on each side of the electrolyte is sandwiched by separators (bipolar plates).

The electrolyte electrode assembly comprises a stack body of an electrolyte as a dense layer and electrode layers as porous layers. To produce the electrolyte electrode assembly, a plurality of firing steps are performed to form an electrolyte and electrode layers successively.

One way of making the overall process of producing an electrolyte electrode assembly efficient would be to fire an electrolyte and electrode layers integrally together. Since the dense layer and the porous layers are made of different materials, it is necessary to accurately inspect whether the fired stack body (electrolyte electrode assembly) is acceptable or not.

Japanese laid-open patent publication No. 2002-090346, for example, discloses a method of inspecting a ceramics sheet for through pores. According to the disclosed method, an insulative ceramics sheet is sandwiched between two parallel electrode plates, and a discharged current generated when a high DC voltage is applied between the electrode plates is detected to inspect whether there are through pores having a minimum length of 2 Å in the insulative ceramics sheet or not.

Japanese laid-open patent publication No. 2004-327129 discloses an apparatus for inspecting a hollow cylindrical solid oxide fuel cell. According to the disclosed apparatus, a cell tube comprising a plurality of unit cells, each comprising an air pole, an electrolyte, and a fuel pole which are disposed on a base tube, connected together by an interconnector, is inspected for performance at a high temperature. The apparatus includes a continuous furnace having a temperature increasing zone, a high temperature holding zone, and a temperature lowering zone that are successively arranged from an inlet side, supports for supporting the upper ends of cell tubes, and a feed means for feeding the supports. A fuel supply unit to the cell tubes and a fuel discharge unit from the cell tubes are kept at normal temperature. At the same time, the cell tubes are successively moved from the temperature increasing zone, the high temperature holding zone, and the temperature lowering zone. In the high temperature holding zone, the cell tubes are inspected for performance and also inspected for strength screening at a high temperature based on stresses applied to lower portions of the cell tubes.

Japanese laid-open patent publication No. 2005-108801 discloses an apparatus for detecting a defect in a stack body of at least a porous layer and a dense layer. The apparatus comprises a heating source or a cooling source and a temperature distribution detector. The heating source or the cooling source is disposed near the porous layers for uniformly heating or cooling inspected regions of the porous layers. The temperature distribution detector is disposed near the dense layer for detecting the distribution of heat transmitted from the porous layers to an inspected region of the dense layer which lies adjacent to the inspected regions of the porous layers in the direction along which the dense layer and the porous layers are stacked.

According to the method disclosed in Japanese laid-open patent publication No. 2002-090346, the high DC voltage has to be applied to all insulative ceramics sheets to inspect them for through pores. Consequently, the inspecting process is complex and time-consuming. In addition, the apparatus requires a high voltage applying device.

Furthermore, the disclosed apparatus is only designed to inspect an insulative ceramics sheet to check if there are through pores in the insulative ceramics sheet or not, and is unable to inspect an insulative ceramics sheet for its structural density, making it difficult to determine whether the current-voltage characteristics of the MEA are acceptable or not. In addition, the high DC voltage applied to the stack body tends to degrade the stack body.

According to the apparatus disclosed in Japanese laid-open patent publication No. 2004-327129, all cell tubes have to be inspected for performance at a high temperature. Therefore, many inspecting steps and a long inspecting time are required, and various inspection facilities including a high temperature furnace, a heater, etc. are necessary. The disclosed apparatus is thus not economical. Furthermore, the cell tubes may possibly be degraded due to temperature changes and oxidation and reduction behaviors during the inspecting process.

According to the apparatus disclosed in Japanese laid-open patent publication No. 2005-108801, all stack bodies are heated or cooled and the distribution of heat transmitted from the porous layers of each of the stack bodies is detected. Therefore, many inspecting steps and a long inspecting time are required, and various inspection facilities including a heater, a Peltier device, an infrared camera, an ultrasonic transducer, an ultrasonic probe, etc. are necessary. The disclosed apparatus is thus not economical. In addition, the disclosed apparatus fails to check the structural density that greatly affects the conductivity of the stack bodies. The stack bodies may possibly be degraded due to temperature changes, vibrations, etc. during the inspecting process.

DISCLOSURE OF INVENTION

It is an object of the present invention to provide a method of, an apparatus for, and a program for inspecting a stack body to detect the shrinkage rate and the current-voltage characteristic of the stack body and to reliably determine whether the power generation capability of the stack body is acceptable or not, with an arrangement and a process which are simple and economical, and are not burdensome on the stack body.

According to the present invention, there is provided a method of inspecting a stack body of at least a porous layer and a dense layer. The method comprises the first step of measuring at least one of the length, area, and volume of the stack body before the stack body is fired, the second step of measuring at least one of the length, area, and volume of the stack body after the stack body is fired, the third step of calculating a shrinkage rate of the stack body based on a first measured value from the first step and a second measured value from the second step, the fourth step of determining whether the calculated shrinkage rate of the stack body is acceptable or not based on the calculated shrinkage rate from the third step, the fifth step of calculating an S/N ratio of the stack body based on the first measured value and the second measured value, and the sixth step of determining whether a current-voltage characteristic of the stack body is acceptable or not based on the calculated S/N ratio from the fifth step.

The S/N ratio refers to the ratio of a signal to a noise, and is widely used for mechanical, electrical, and chemical fields, and quality control in addition to the field of electric communications. According to the present invention, the relationship between S/N ratios and current-voltage characteristics of stack bodies is established, and the current-voltage characteristic of the stack body in question is determined for their acceptability based on the calculated S/N ratio.

According to the present invention, there is also provided an apparatus for inspecting a stack body of at least a porous layer and a dense layer, comprising a measuring device for measuring at least one of the length, area, and volume of the stack body before and after the stack body is fired, a first arithmetic unit for calculating a shrinkage rate of the stack body based on a first measured value measured by the measuring device before the stack body is fired and a second measured value measured by the measuring device after the stack body is fired, a first determining unit for determining whether the calculated shrinkage rate of the stack body is acceptable or not based on the shrinkage rate calculated by the first arithmetic unit, a second arithmetic unit for calculating an S/N ratio of the stack body based on the first measured value and the second measured value, and a second determining unit for determining whether the current-voltage characteristic of the stack body is acceptable or not based on the S/N ratio calculated by the second arithmetic unit.

According to the present invention, there is further provided a program for enabling a computer to inspect a stack body of at least a porous layer and a dense layer, comprising the steps of obtaining a first measured value representative of at least one of the length, area, and volume of the stack body before the stack body is fired, obtaining a second measured value representative of at least one of the length, area, and volume of the stack body after the stack body is fired, calculating a shrinkage rate of the stack body based on the first measured value and the second measured value, determining whether the calculated shrinkage rate of the stack body is acceptable or not based on the calculated shrinkage rate, calculating an S/N ratio of the stack body based on the first measured value and the second measured value, and determining whether the current-voltage characteristic of the stack body is acceptable or not based on the calculated S/N ratio.

According to the present invention, the shrinkage rate of the stack body before and after it is fired is calculated and then determined for its acceptability. Therefore, if the stack body has an undue low shrinkage rate, i.e., if the stack body has a dense layer that is not sufficiently densified, then the stack body can be rejected. Therefore, a stack body having a high power generation capability can reliably be detected with an arrangement and a process which are simple and economical, and are not burdensome on the stack body.

Furthermore, since the S/N ratio of the stack body is calculated, and the current-voltage characteristic of the stack body is determined for their acceptability based on the calculated S/N ratio. Therefore, a stack body having a low power generation capability (current-voltage characteristic) can be rejected. It is thus possible to reliably detect a stack body having a high power generation capability with an arrangement and a process which are simple and economical, and are not burdensome on the stack body.

The above and other objects, features; and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 5 is a flowchart of the inspecting method and the inspecting program; and

FIG. 6 is a graph showing the relationship between the shrinkage rate and the S/N ratio.

BEST MODE FOR CARRYING OUT THE INVENTION

Figure 1:
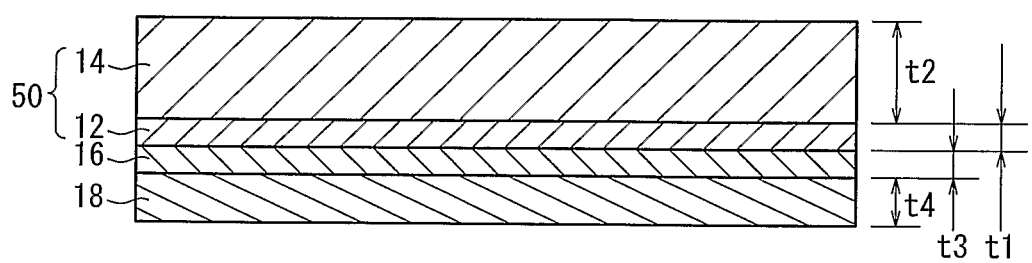
FIG. 1 is a schematic cross-sectional view of an electrolyte electrode assembly as a stack body to which a method of, an apparatus for, and a program for inspecting a stack body according to an embodiment of the present invention are applicable.

As shown in FIG. 1, an electrolyte electrode assembly (membrane electrode assembly) 10, which is also referred to as MEA 10 hereinafter, comprises an electrolyte (dense layer) 12, an anode (porous layer) 14 disposed on one surface of the electrolyte 12, and a cathode (porous layer) 18 disposed on the other surface of the electrolyte 12 with an intermediate layer 16 interposed therebetween.

The electrolyte 12 is made of yttria-stabilized zirconia (YSZ) system, for example. The anode 14 is made of nickel-yttria-stabilized zirconia (Ni-YSZ) system cermet, for example. The intermediate layer 16 is made of gadolinium-doped ceria (GDC) system, for example. The cathode 18 is made of lanthanum strontium cobalt ferrite (LSCF) system, for example. Another intermediate layer 16 may be interposed between the electrolyte 12 and the anode 14.

The electrolyte 12 may alternatively be made of samarium-doped ceria (SDC) system, scandia-stabilized zirconia (ScSZ) system, lanthanum gallate (LSGM, LSGMC) system, gadolinium-doped ceria (GDC) system, or yttria-doped ceria (YDC) system.

The anode 14 may alternatively be made of nickel-samarium-doped ceria (Ni-SDC) system cermet or nickel-scandia-stabilized zirconia (Ni-ScSZ) system cermet.

The intermediate layer 16 may alternatively be made of samarium-doped ceria (SDC) system or yttria-doped ceria (YDC) system.

The cathode 18 may alternatively be made of lanthanum strontium manganite (LSM) system, lanthanum strontium cobaltite (LSC) system, barium strontium cobaltite (BSC) system, barium strontium cobalt ferrite (BSCF) system, or samarium strontium cobaltite (SSC) system.

The electrolyte 12, the anode 14, the intermediate layer 16, and the cathode 18 have respective thicknesses t1, t2, t3, t4, as described later.

Figure 2:
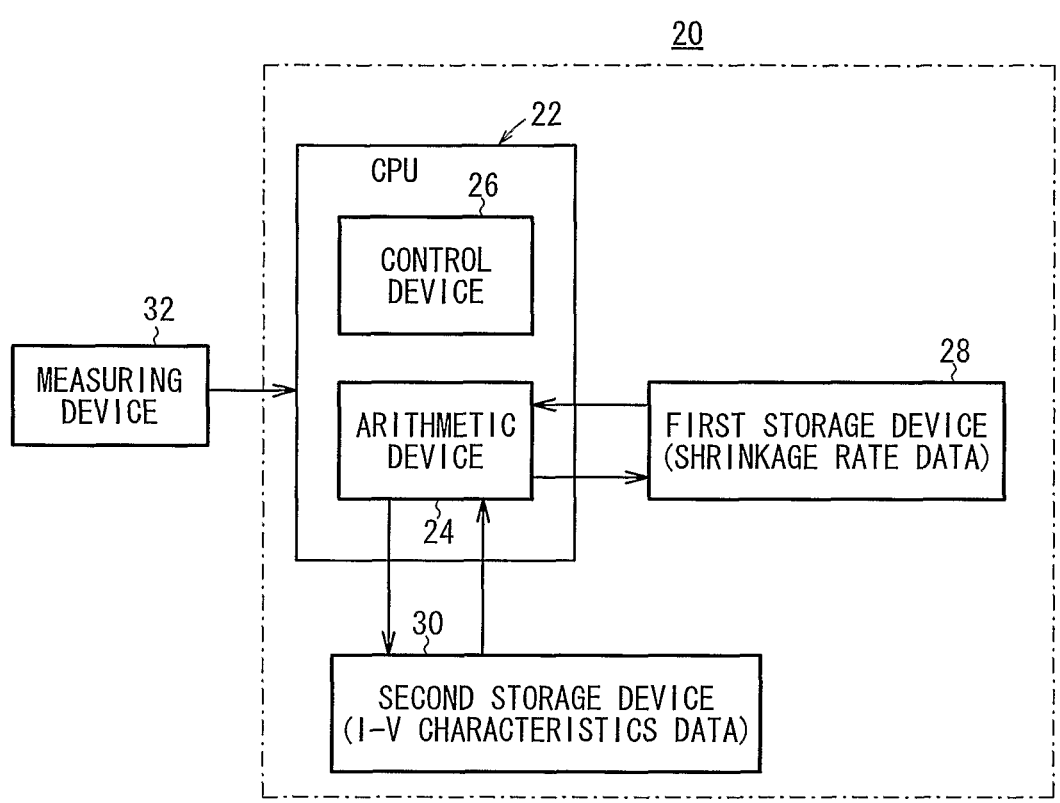
FIG. 2 is a block diagram of a computer of the inspecting apparatus.

FIG. 2 shows in block form a computer 20 of an inspecting apparatus according to an embodiment of the present invention. As shown in FIG. 2, the computer 20 includes a CPU (central processing unit) 22 having an arithmetic device 24 and a control device 26. The arithmetic device 24 is connected to a first storage device 28 and a second storage device 30. The CPU 22 is supplied with a detected signal, to be described later, from an external measuring device 32.

Figure 3:
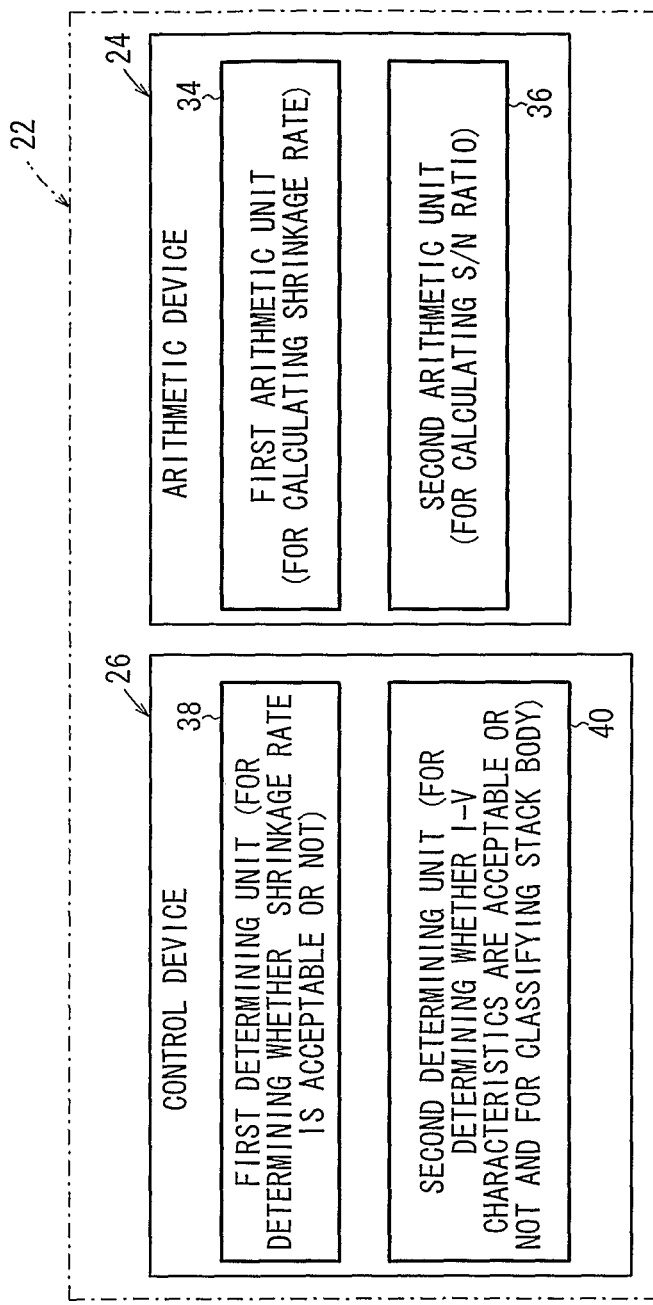
FIG. 3 is a block diagram of a CPU of the computer.

As shown in FIG. 3, the arithmetic device 24 comprises a first arithmetic unit 34 for calculating a shrinkage rate of the MEA 10 based on the measured values of lengths, areas, or volumes of the MEA 10 that are input from the measuring device 32 before and after the MEA 10 is fired, and a second arithmetic unit 36 for calculating an S/N ratio of the MEA 10 based on the measured values referred to above.

The control device 26 comprises a first determining unit 38 for determining whether the shrinkage rate of the MEA 10 is acceptable or not based on the shrinkage rate calculated by the first arithmetic unit 34, and a second determining unit 40 for determining whether the current-voltage characteristics (I-V characteristics) of the MEA 10 are acceptable or not based on the S/N ratio calculated by the second arithmetic unit 36 and for classifying the MEA 10 into one of ranks corresponding to different current-voltage characteristics.

Figure 4:
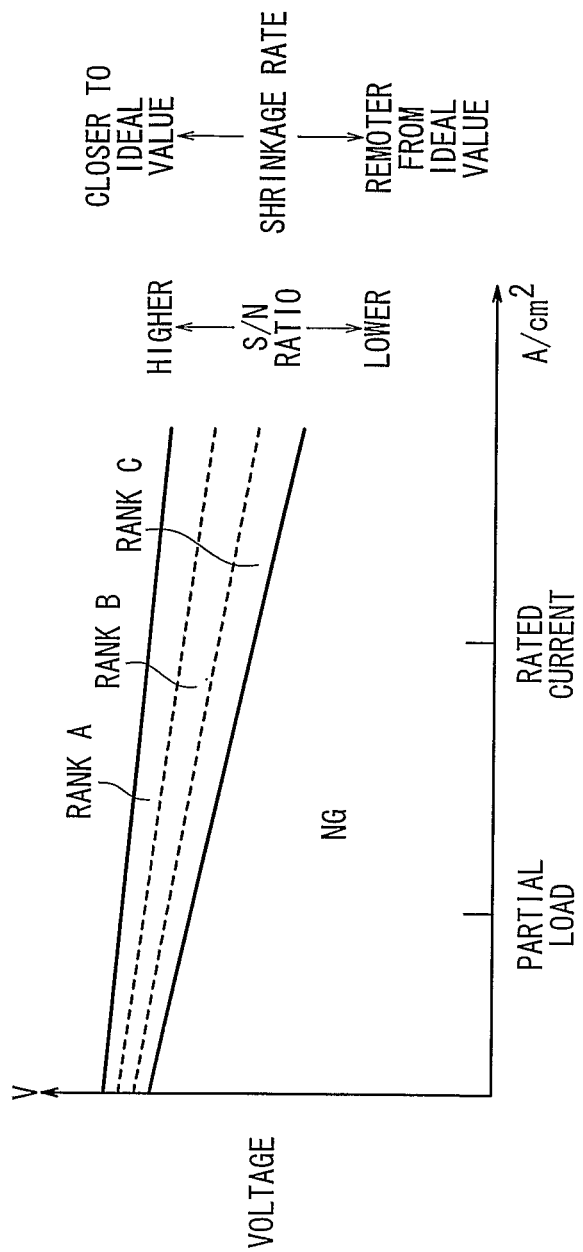
FIG. 4 is a graph showing current-voltage characteristics data.

The first storage device 28 stores shrinkage rate data based on which to determine whether the shrinkage rate of the MEA 10 is acceptable or not. The second storage device 30 stores current-voltage characteristics data in relation to shrinkage rates and/or S/N ratios, as shown in FIG. 4.

The measuring device 32 comprises, for example, a three-dimensional shape measuring device for measuring the lengths of the sides of the MEA 10 in a non-contact fashion.

An inspecting method according to the present embodiment will be described below with reference to a flowchart shown in FIG. 5.

The MEA 10 shown in FIG. 1 serves as an anode support cell, for example. Before the MEA 10 is fired, the thickness t1 of the electrolyte 12 is adjusted to a value in the range from 0.5μ to 30μ. The thickness t2 of the anode 14 is adjusted to a value in the range from 100μ to 1000μ. The thickness t3 of the intermediate layer 16 is adjusted to a value in the range from 0.5μ to 30μ. The thickness t4 of the cathode 18 is adjusted to a value in the range from 1μ to 100μ.

As shown in FIG. 1, the electrolyte 12 and the anode 14 are stacked, making up the stack body 50. First, the stack body 50 is fired as follows: Before the stack body 50 is fired, the lengths of the four sides of the stack body 50 are measured in a non-contact fashion by the measuring device 32 in step S1 shown in FIG. 5. The measured values, which are referred to as first measured values, are sent from the measuring device 32 to the arithmetic device 24 of the CPU 22.

After the stack body 50 is fired in step S2, the lengths of the four sides of the stack body 50 are measured again in a non-contact fashion by the measuring device 32 in step S3. The measured values, which are referred to as second measured values, are sent from the measuring device 32 to the arithmetic device 24 of the CPU 22.

Based on the first measured values and the second measured values supplied to the arithmetic device 24, the first arithmetic unit 34 calculates a shrinkage rate of the stack body 50 in step S4. For example, if the length of each of the four sides of the stack body 50 is 100 mm before the stack body 50 is fired and the length of each of the four sides of the stack body 50 is 80 mm after the stack body 50 is fired, then the calculated shrinkage rate of the stack body 50 for the length of each side is 20.0%.

The first determining unit 38 of the control device 26 reads the shrinkage rate data stored in the first storage device 28 in step S5. Based on the shrinkage rate data, the first determining unit 38 determines whether the calculated shrinkage rate is acceptable or not in step S6. If the first determining unit 38 determines that the calculated shrinkage rate of the stack body 50 before and after it is fired is acceptable (YES in step S6), then control goes to step S7 in which the second arithmetic unit 36 calculates an S/N ratio.

A shrinkage rate of the stack body 50 for its area before and after it is fired and a shrinkage rate of the stack body 50 for its volume before and after it is fired are determined for their acceptability based on shrinkage rate data that are different from those for the length because the stack body 50 has different shrinkage rates depending on lengthwise, widthwise, and thicknesswise dimensions thereof.

In step S6, the calculated shrinkage rate is determined as being better if it is closer to an ideal value. The ideal value varies depending on the raw materials of the stack body 50, the temperature at which the stack body 50 is fired, etc.

In step S7, the second arithmetic unit 36 calculates an S/N ratio according to the following equations.

It is assumed that the measured value of a side of the stack body 50 before it is fired is represented by m, the measured value of the side of the stack body 50 after it is fired is represented by y, and number of measured sides (n=4 if four sides are measured) is represented by n. The values of m×y, $m^2$, and $y^2$ of each of the sides of the stack body 50 are determined.

Then, $L=\Sigma(m \times y)$, $r=\Sigma(m^2)$, and $ST=\Sigma(y^2)$ (the number of measured sides is n) are established, after which $S\beta=L^2/r$, $Se=ST-S\beta$, $Ve=Se/(n-1)$, $\beta^2=(S\beta-Ve)/r$, and $\sigma^2=Ve$ are successively calculated to produce η (S/N ratio)=$10\log(\beta^2/\sigma^2)$ [dB]. The S/N ratio is determined as better if it is higher.

Then, control goes to step S8 in which the second determining unit 40 reads the current-voltage characteristics data from the second storage device 30. As shown in FIG. 4, the current-voltage characteristics data are better if the S/N ratio is higher and the shrinkage rate is closer to a target value. In step S9, the second determining unit 40 determines whether the current-voltage characteristics of the stack body 50 are acceptable or not based on the calculated S/N ratio.

According to the present embodiment, the shrinkage rate of the stack body 50 before and after it is fired is calculated and then determined for its acceptability based on the preset shrinkage rate data. Consequently, stack bodies 50 which have undue low shrinkage rates, i.e., which have electrolytes 12 that are not sufficiently densified, can be rejected. As a stack body 50 having a high power generation capability can reliably be detected with an arrangement and a process which are simple and economical, and are not burdensome on the stack body, it is possible to manufacture a high-quality MEA 10.

Furthermore, the S/N ratio of the stack body 50 is calculated, and the current-voltage characteristics of the stack body 50 are determined for their acceptability based on the calculated S/N ratio. Stack bodies 50 with low S/N ratios suffer shrinkage variations, warpage, undulations, etc. If the stack body 50 is irregularily densified due to shrinkage variations, then the MEA 10 causes power generation irregularities, tending to give rise to a temperature distribution therein, and also causes internal stress irregularities, resulting in a reduction in the power generation efficiency thereof. If the stack body 50 suffers warpage or undulations, then the MEA 10 is not held in intimate contact with a current collector, which brings about a current collection failure leading to an increased contact resistance and an increased resistance overpotential.

By determining whether the current-voltage characteristics of the stack body 50 are acceptable or not based on the S/N ratio, it is possible to reliably detect a stack body 50 having a high power generation capability with an arrangement and a process which are simple and economical, and are not burdensome on the stack body. Specifically, as shown in FIG. 6, a stack body 50 having a high S/N ratio in the neighborhood of a desired shrinkage rate, e.g., an ideal value, has a good power generation capability.

In step S9, the second determining unit 40 can determine whether the current-voltage characteristics of the stack body 50 are acceptable or not from the current-voltage characteristics data based on the calculated S/N ratio and the calculated shrinkage rate. Accordingly, the current-voltage characteristics of the stack body 50 are determined for their acceptability with higher accuracy. As a result, a stack body 50 having a high power generation capability can be reliably detected with ease.

In step S9, the second determining unit 40 is capable of classifying the stack body 50 into one of ranks corresponding to different current-voltage characteristics, as well as judging the current-voltage characteristics of the stack body 50 for their acceptability. Therefore, for manufacturing a fuel cell or a fuel cell stack, a plurality of MEAs 10 having similar current-voltage characteristics can be combined with each other for minimum differences between the current-voltage characteristics of the MEAs 10 in the fuel cell or the fuel cell stack. The power generation capabilities, temperatures, and fuel utilization ratios of the MEAs 10 are uniformized to make the fuel cell or the fuel cell stack durable and operable for a longer service life.

If the shrinkage rate of the stack body 50 is determined as unacceptable in step 6 (NO), the processing from step S7 is canceled. Consequently, the defective stack body 50 is rejected at an early stage. The inspecting time and the inspecting process are thus shortened, and the efficiency of the entire inspection procedure is increased.

Since the stack body 50 is made up of the electrolyte 12 and the anode 14 which serve as components of the MEA 10, the MEA 10 including the stack body 50 has a desired power generation capability and exhibits good current-voltage characteristics free of internal structural density variations.

In the illustrated embodiment, the stack body 50 is of a two-layer structure made up of the electrolyte 12 and the anode 14. However, the stack body may comprise two layers such as the electrolyte 12 and the intermediate layer 16 or the electrolyte 12 and the cathode 18. Alternatively, the stack body may comprise three or more layers.

For example, the stack body 50 may comprise three layers such as the electrolyte 12, the anode 14, and the intermediate layer 16, or the electrolyte 12, the anode 14, and the cathode 18, or the electrolyte 12, the cathode 18, and the intermediate layer 16. Alternatively, the stack body 50 may comprise four layers such as the electrolyte 12, the anode 14, the intermediate layer 16, and the cathode 18, or five layers such as the electrolyte 12, the anode 14, the cathode 18, the intermediate layer 16 (closer to the anode 14), and the intermediate layer 16 (closer to the cathode 18). The intermediate layer 16 may be interposed, or may not be interposed, between the electrolyte 12 and the anode 14, or between the electrolyte 12 and the cathode 18, or both between the electrolyte 12 and the anode 14 and between the electrolyte 12 and the cathode 18.

The MEA 10 serves as an anode support cell with the thickness t2 of the anode 14 being in the range from 100μ to 1000μ. However, the MEA 10 is not limited to such an arrangement. For instance, the MEA may serve as an electrolyte support cell with the thickness t1 of the electrolyte 12 being in the range from 100μ to 1000μ, the thickness t2 of the anode 14 and the thickness t4 of the cathode 18 being in the range from 1μ to 100μ, and the thickness t3 of the intermediate layer 16 being in the range from 0.5μ to 30μ. With such an arrangement, when the stack body 50 is fired, the electrolyte 12, the anode 14, the intermediate layer 16, and the cathode 18 thereof are shrunk to a thickness which is about 80% of the thickness before the stack body 50 is fired.

Although a certain preferred embodiment of the present invention has been shown and described in detail, it should be understood that various changes and modifications may be made therein without departing from the scope of the appended claims.

The invention claimed is:

1. A method of inspecting a stack body of at least a porous layer and a dense layer, comprising the steps of:
  (a) measuring at least one of the length, area, and volume of the stack body before the stack body is fired;
  (b) measuring at least one of the length, area, and volume of the stack body after the stack body is fired;
  (c) calculating with a processing unit a shrinkage rate of the stack body based on a first measured value from the step (a) and a second measured value from the step (b);
  (d) determining with the processing unit whether the calculated shrinkage rate of the stack body is acceptable or not based on the calculated shrinkage rate from the step (c);
  (e) calculating with the processing unit an S/N ratio of the stack body based on the first measured value and the second measured value; and
  (f) determining with the processing unit whether a current-voltage characteristic of the stack body is acceptable or not based on the calculated S/N ratio from the step (e).

2. A method according to claim 1, wherein the step (f) comprises the step of determining whether the current-voltage characteristic of the stack body is acceptable or not from preset current-voltage characteristic data of the stack body, based on the calculated S/N ratio and the calculated shrinkage rate.

3. A method according to claim 1, wherein the step (f) comprises the step of classifying the stack body into one of ranks corresponding to different current-voltage characteristic, in addition to the step of determining whether the current-voltage characteristic of the stack body is acceptable or not.

4. A method according to claim 1, wherein the step (d) is followed by the step (e) only if the calculated shrinkage rate of the stack body is determined as acceptable in the step (d).

5. A method according to claim 1, wherein the stack body comprises a fuel cell electrolyte electrode assembly of at least an electrode layer as the porous layer and a solid electrolyte as the dense layer.

6. An apparatus for inspecting a stack body of at least a porous layer and a dense layer, comprising:
  a measuring device for measuring at least one of the length, area, and volume of the stack body before and after the stack body is fired;
  a first arithmetic unit for calculating a shrinkage rate of the stack body based on a first measured value measured by the measuring device before the stack body is fired and a second measured value measured by the measuring device after the stack body is fired;
  a first determining unit for determining whether the calculated shrinkage rate of the stack body is acceptable or not based on the shrinkage rate calculated by the first arithmetic unit;
  a second arithmetic unit for calculating an S/N ratio of the stack body based on the first measured value and the second measured value; and a second determining unit for determining whether a current-voltage characteristic of the stack body is acceptable or not based on the S/N ratio calculated by the second arithmetic unit.

7. An apparatus according to claim 6, wherein the second determining unit determines whether the current-voltage characteristic of the stack body is acceptable or not from preset current-voltage characteristic data of the stack body, based on the calculated S/N ratio and the calculated shrinkage rate.

8. An apparatus according to claim 6, wherein the second determining unit classifies the stack body into one of ranks corresponding to different current-voltage characteristics, in addition to determining whether the current-voltage characteristic of the stack body is acceptable or not.

9. An apparatus according to claim 6, wherein the stack body comprises a fuel cell electrolyte electrode assembly of at least an electrode layer as the porous layer and a solid electrolyte as the dense layer.

10. A non-transitory computer-readable medium storing instructions for enabling a computer to inspect a stack body of at least a porous layer and a dense layer, the instructions when executed causing the computer to perform the steps of:
   (a) obtaining a first measured value representative of at least one of the length, area, and volume of the stack body before the stack body is fired;
   (b) obtaining a second measured value representative of at least one of the length, area, and volume of the stack body after the stack body is fired;
   (c) calculating a shrinkage rate of the stack body based on the first measured value and the second measured value;
   (d) determining whether the calculated shrinkage rate of the stack body is acceptable or not based on the calculated shrinkage rate;
   (e) calculating an S/N ratio of the stack body based on the first measured value and the second measured value; and
   (f) determining whether a current-voltage characteristic of the stack body is acceptable or not based on the calculated S/N ratio.

11. A program according to claim 10, wherein the step (f) comprises the step of determining whether the current-voltage characteristic of the stack body is acceptable or not from preset current-voltage characteristic data of the stack body based on the calculated S/N ratio and the calculated shrinkage rate.

12. A program according to claim 10, wherein the step (f) comprises the step of classifying the stack body into one of ranks corresponding to different current-voltage characteristics, in addition to the step of determining whether the current-voltage characteristic of the stack body is acceptable or not.

13. A program according to claim 10, wherein the stack body comprises a fuel cell electrolyte electrode assembly of at least an electrode layer as the porous layer and a solid electrolyte as the dense layer.

* * * * *